United States Patent
Tanaka et al.

(10) Patent No.: US 11,298,863 B2
(45) Date of Patent: Apr. 12, 2022

(54) INJECTION MOLDING SYSTEM

(71) Applicant: FANUC CORPORATION, Yamanashi (JP)

(72) Inventors: Kazuyoshi Tanaka, Yamanashi (JP); Junpei Maruyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 19 days.

(21) Appl. No.: 16/831,166

(22) Filed: Mar. 26, 2020

(65) Prior Publication Data
US 2020/0307052 A1    Oct. 1, 2020

(30) Foreign Application Priority Data
Mar. 28, 2019 (JP) .............................. JP2019-062382

(51) Int. Cl.
*B29C 45/00* (2006.01)
*B29C 45/76* (2006.01)
*B29C 45/84* (2006.01)

(52) U.S. Cl.
CPC .............. *B29C 45/76* (2013.01); *B29C 45/84* (2013.01)

(58) Field of Classification Search
CPC ....... B29C 45/76; B29C 45/84; B29C 45/766; B29C 45/76939; B29C 45/768; B29C 45/762
See application file for complete search history.

(56) References Cited

U.S. PATENT DOCUMENTS

| 7,534,378 B2 * | 5/2009 | Smith | B29B 7/7485 |
| | | | 264/40.1 |
| 2018/0147765 A1 * | 5/2018 | Nanri | B29C 45/7653 |
| 2018/0311878 A1 * | 11/2018 | Grimm | B29C 45/768 |

FOREIGN PATENT DOCUMENTS

| JP | 63-3924 | 1/1988 |
| JP | 4-59325 | 2/1992 |
| JP | 9-225986 | 9/1997 |
| JP | 2005-189989 | 7/2005 |
| JP | 2006-289778 | 10/2006 |

(Continued)

OTHER PUBLICATIONS

Notification of Reasons for Refusal dated Jun. 1, 2021 in Japanese Patent Application No. JP 2019-062382.

*Primary Examiner* — Joseph S Del Sole
*Assistant Examiner* — Thu Khanh T Nguyen
(74) *Attorney, Agent, or Firm* — Wenderoth, Lind & Ponack, L.L.P.

(57) ABSTRACT

An injection molding system includes: an injection molding machine; a screen setting storage unit provided in the injection molding machine and storing a setting state of the injection molding machine; an operation limiting unit provided in the injection molding machine and limiting operation of the injection molding machine; and a management unit including a storage unit that stores a list of a correct combination of screen settings and limiting operation of the injection molding machine, a confirmation unit that compares information of the screen setting storage unit and information of the storage unit to confirm a propriety of a combination of the screen settings of the injection molding machine, and a limiting operation determination unit that determines a limiting operation upon receiving a result confirmed by the confirmation unit to issue an operation limiting command to the operation limiting unit.

7 Claims, 9 Drawing Sheets

(56) References Cited

FOREIGN PATENT DOCUMENTS

| JP | 2016-144819 | 8/2016 |
|----|-------------|--------|
| JP | 2016-185694 | 10/2016 |

* cited by examiner

| NO. | ITEM | CORRECT SETTING | LIMITING OPERATION | CONFIRMA-TION STATE |
|---|---|---|---|---|
| 1 | MOLD HEATER | ON | MOLD CLOSING | NG |
| 2 | PROCESS MONITORING | ON | FULL-AUTOMATIC OPERATION | OK |
| 3 | EJECTOR RETRACTION CONFIRMATION | ON | FULL-SEMI AUTOMATIC OPERATION | OK |
| 4 | MOLD TEMPERATURE CONTROLLER | ON | SCREW OPERATION | NG |
| 5 | PICKER | ON | MOLD OPENING AND CLOSING | NG |
| 6 | DEFECTIVE PRODUCT ALARM | ON | FULL-AUTOMATIC OPERATION | OK |

FIG. 6

```
START
  ↓
REGISTER MOLD HEATER ON           ~ STEP1
IN PC OR MOLDING MACHINE
  ↓
REGISTER PICKER ON IN PC          ~ STEP2
OR MOLDING MACHINE
  ↓
REGISTER PROCESS
MONITORING ON IN PC OR            ~ STEP3
MOLDING MACHINE
  ↓
IS PRODUCTION START TIME CONFIRMATION CONDITION OK?  ~ STEP4
  NO → (loop back to START)
  YES ↓
END
```

FIG. 7

| NO. | ITEM | SETTING AT THE TIME OF PRODUCTION | LIMITING OPERATION | CONFIRMATION STATE |
|---|---|---|---|---|
| 1 | MOLD HEATER | ON | MOLD CLOSING | OK |
| 2 | PICKER | ON | MOLD OPENING AND CLOSING | OK |
| 3 | PROCESS MONITORING | ON | FULL-AUTOMATIC OPERATION | NG |

INJECTION MOLDING SYSTEM

This application is based on and claims the benefit of priority from Japanese Patent Application No. 2019-062382, filed on 28 Mar. 2019, the content of which is incorporated herein by reference.

BACKGROUND OF THE INVENTION

Field of the Invention

The present invention relates to an injection molding system.

Related Art

Injection molding machines include a clamping unit that moves a moving platen with respect to a stationary platen, opens and closes a mold, and performs clamping, and an injection unit that is provided to be relatively movable with respect to the stationary platen by a feed mechanism, and injects a molding material such as a molten resin into a cavity of a pair of molds clamped.

Furthermore, a system has been put into practical use which performs injection molding by automatic operation in which an injection molding machine is controlled to be actuated with peripheral devices such as a temperature controller, a resin feeder, a picker (a robot) for taking out and conveying a molded article, and the like, in a predetermined order.

Furthermore, since injection molding systems differ in the specification and configuration of various peripheral devices depending on the mold, etc., the injection molding machine (molding machine main body) is provided with a setting management unit for operating together with various peripheral devices, and thus it is possible to perform the setting of operation control of various peripheral devices and the injection molding system in the screen setting by an operator (for example, the setting of whether to enable control of a mold heater, the setting of temporarily turning off a certain peripheral device for operation such as changeover or intermittent stop (an accident that can be easily recovered by an operator among accidents whereby equipment suddenly stops during automatic operation, and the like)).

For example, Japanese Unexamined Patent Application, Publication No. 2005-189989 discloses "a method of displaying a file name of a molding condition file in which a file name of a molding condition file stored in memory is displayed on a display, wherein, when the file name is displayed on the display, the file name is listed according to a certain condition, and one or more of the file names of a molding condition file satisfying a specific condition are displayed according to a display mode different from that of another file name".

Patent Document 1: Japanese Unexamined Patent Application, Publication No. 2005-189989

SUMMARY OF THE INVENTION

However, in the screen setting by the conventional operator, for example, the resetting the setting may be forgotten at the start of production, and thus defective products, damage to a mold, etc. may occur.

In addition, depending on the peripheral devices, there is also a risk of a problem occurring by manually operating the mold opening and closing, the screw operation of an injection device, etc. For example, there are cases where inconveniences occur by manually operating the mold opening and purge (resin discharge) in a state in which a mold heater is set to OFF.

Furthermore, in the setting for devices other than the peripheral devices, for example, in a case in which a product is determined as a defective product by the data during production, a function of issuing an alarm is provided. When a molded article is confirmed during semi-automatic operation, the alarm function is set to OFF, and the alarm function is set to ON during mass production. In a case in which the operator switches ON and OFF depending on such operation, the operator may forget to turn ON.

Therefore, it has been strongly desired to develop a method and system that can easily confirm the combination of various devices and specifications, set the limiting operation, etc., and can effectively prevent/suppress inconveniences such as production defects or mold damage due to operational error by an operator, etc.

According to an aspect of the present disclosure, an injection molding system includes: an injection molding machine; a screen setting storage unit provided in the injection molding machine and storing a setting state of the injection molding machine; an operation limiting unit provided in the injection molding machine and limiting operation of the injection molding machine; and a management unit including a storage unit that stores a list of a correct combination of screen settings and limiting operation of the injection molding machine, a confirmation unit that compares information of the screen setting storage unit and information of the storage unit to confirm a propriety of a combination of the screen settings of the injection molding machine, and a limiting operation determination unit that determines a limiting operation upon receiving a result confirmed by the confirmation unit to issue an operation limiting command to the operation limiting unit.

In the injection molding system of one aspect of the present disclosure, a combination list of the normal sets of the screen settings of the molding machine main body and the corresponding limiting operations of the molding machine are prepared, and in a case in which the current settings are not as listed, control can be performed to disable the corresponding limiting operations.

Accordingly, according to the injection molding system according to an aspect of the present disclosure, it is possible to easily and quickly confirm the specifications and the combination of settings of the injection molding machine and the various peripheral devices, and set the corresponding limiting operations, and thus it is possible to prevent/suppress inconveniences such as production defects and mold damage due to operational error effectively and at a low cost as in the conventional manner.

DETAILED DESCRIPTION OF THE INVENTION

Hereinafter, a description will be given of an injection molding system according to an embodiment with reference to FIGS. 1 to 11.

Figure 1:
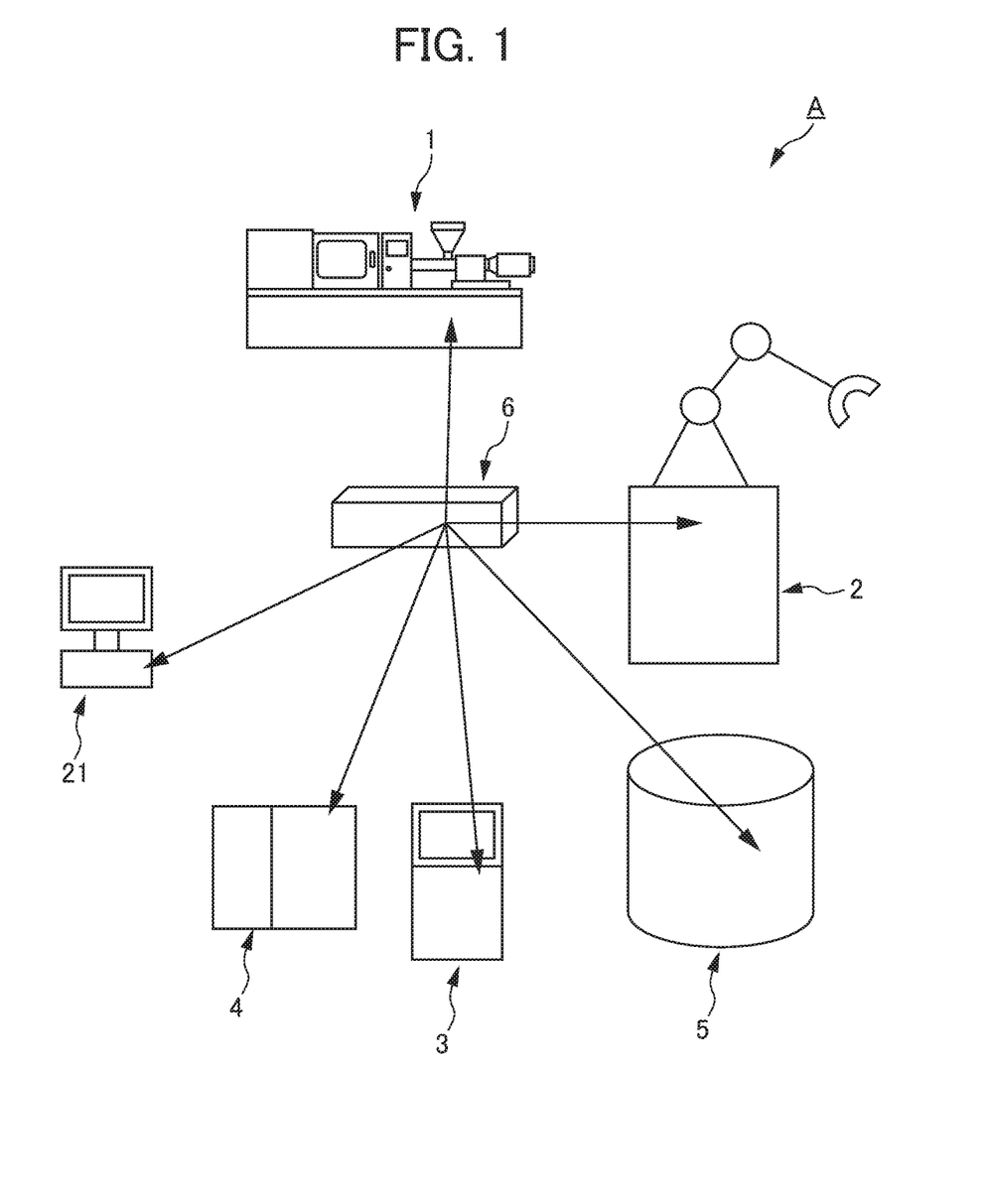
FIG. 1 is a diagram showing an injection molding system of an embodiment.

For example, as shown in FIG. 1, an injection molding system A of the present embodiment includes a well-known injection molding machine 1 having a mold, an injection device or the like, a picker 2 (robot) for taking out and conveying a molded article from the injection molding machine 1, a temperature controller 3, a mold 4 (mold management device), a resin feeder 5 (material feeder), and a communication device 6 (communication unit) that communicates setting conditions of peripheral devices such as the injection molding machine 1, the picker 2, the temperature controller 3, the mold 4, and the resin feeder 5.

Figure 2:
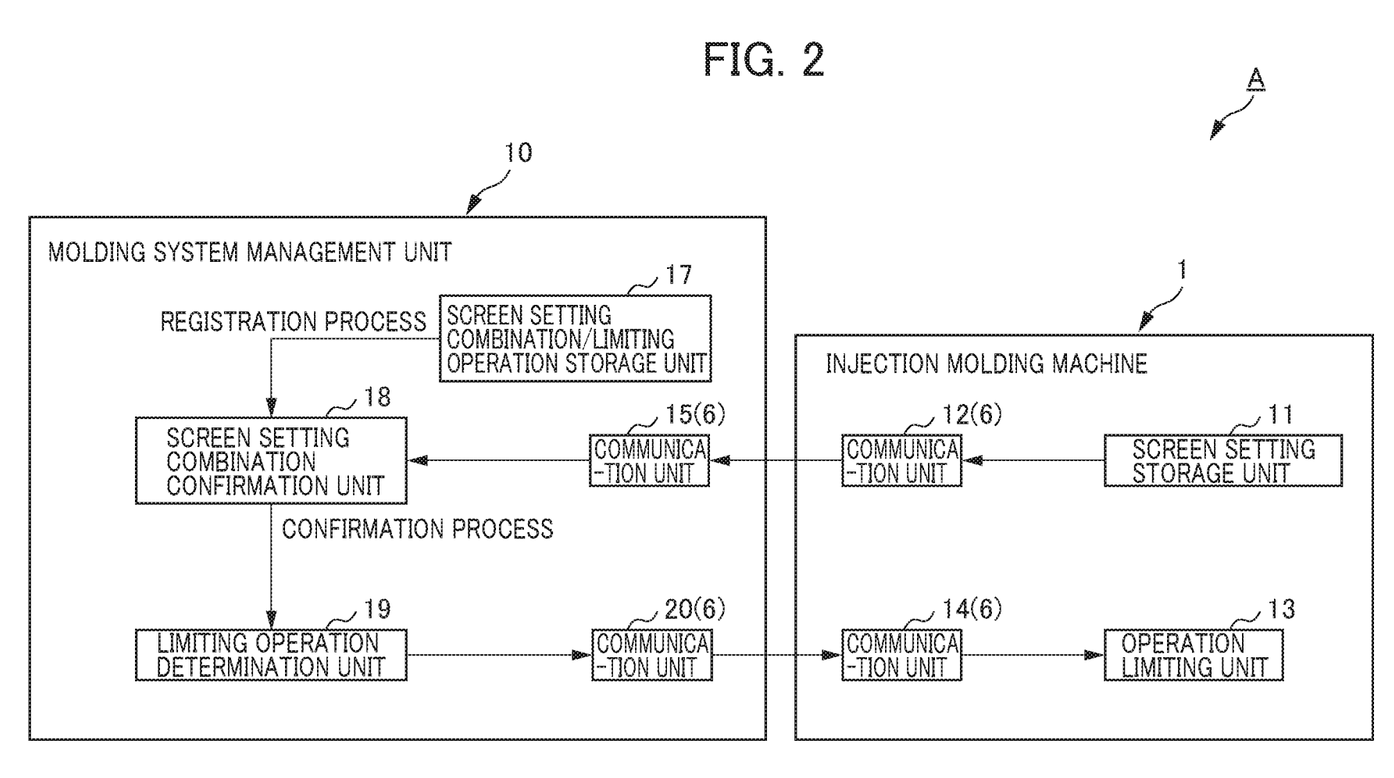
FIG. 2 is a block diagram showing an injection molding system of an embodiment.

In the injection molding system of the present embodiment, as shown in FIG. 2, a management unit 10 is provided, and furthermore, the injection molding machine 1 is provided with a screen setting storage unit 11 that stores a setting state, a first communication unit 12, an operation limiting unit 13, and a second communication unit 14.

The management unit 10 includes a third communication unit 15 for receiving the information of a setting state stored in the screen setting storage unit 11 of the injection molding machine 1 through the first communication unit 12, a storage unit 17 (screen setting combination and limiting operation storage unit) for storing a list 16 (refer to FIG. 3) of the correct combination of the screen settings and the limiting operation, a confirmation unit 18 (screen setting combination confirmation unit) for comparing the information received by the third communication unit 15 with the information stored in the storage unit 17 to confirm the propriety of the combination of the screen settings, a limiting operation determination unit 19 for determining the limiting operation upon receiving the result confirmed by the confirmation unit 18, and a fourth communication unit 20 for sending a determination result by the limiting operation determination unit 19 and an limiting operation command to the second communication unit 14 of the injection molding machine 1 to control the operation by the operation limiting unit 13.

The storage unit 17 stores, in a mold file, the list of the correct combination of the screen settings and the limiting operation of the injection molding machine 1. Furthermore, the limiting operation determination unit 19 prohibits the operation of the automatic operation until the confirmation completion of all of the setting states.

Figure 4:
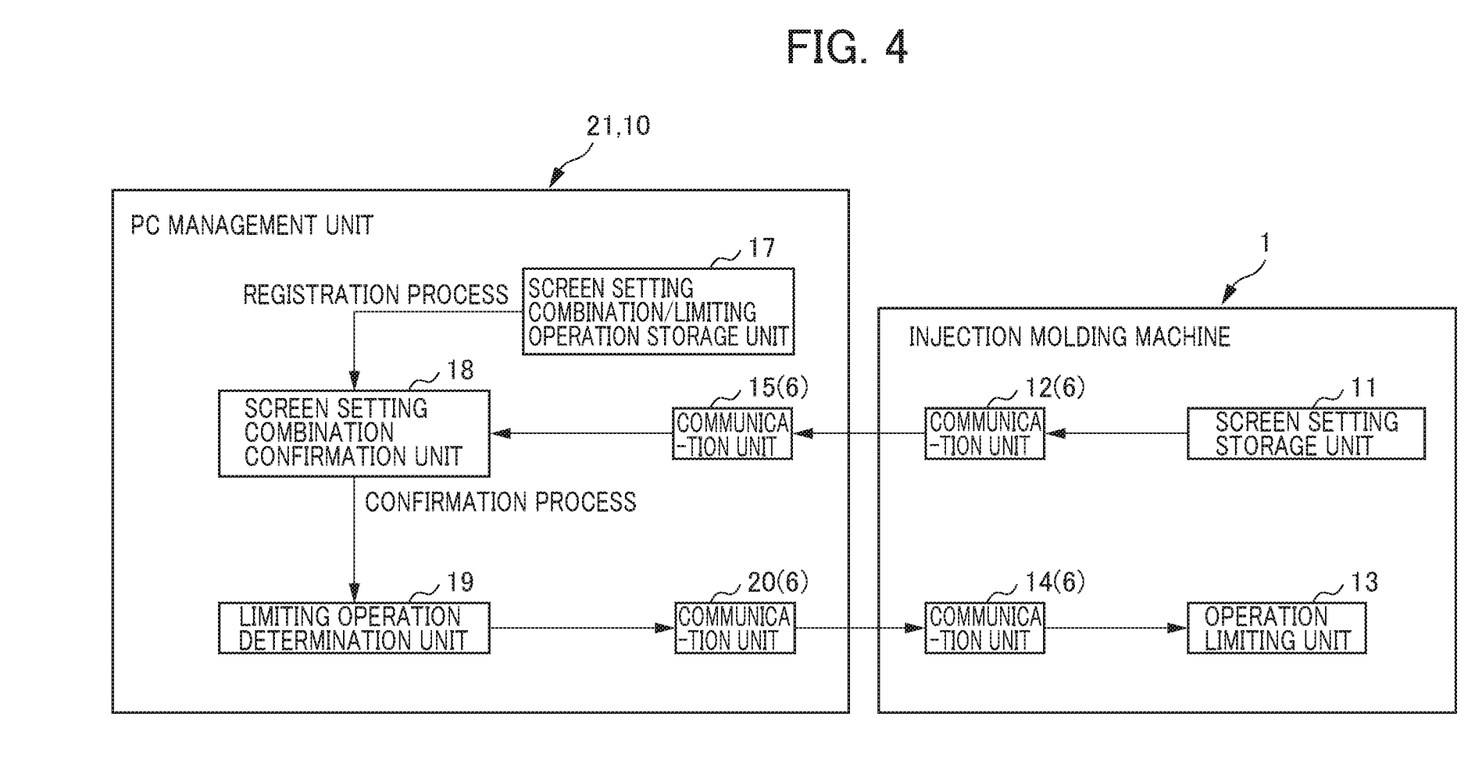
FIG. 4 is a block diagram showing an injection molding system of an embodiment, and showing a case in which a PC is provided with a management unit.

Here, in the injection molding system A of the present embodiment, as shown in FIG. 4, the management unit 10 may be configured by a PC 21 (personal computer).

Figure 5:
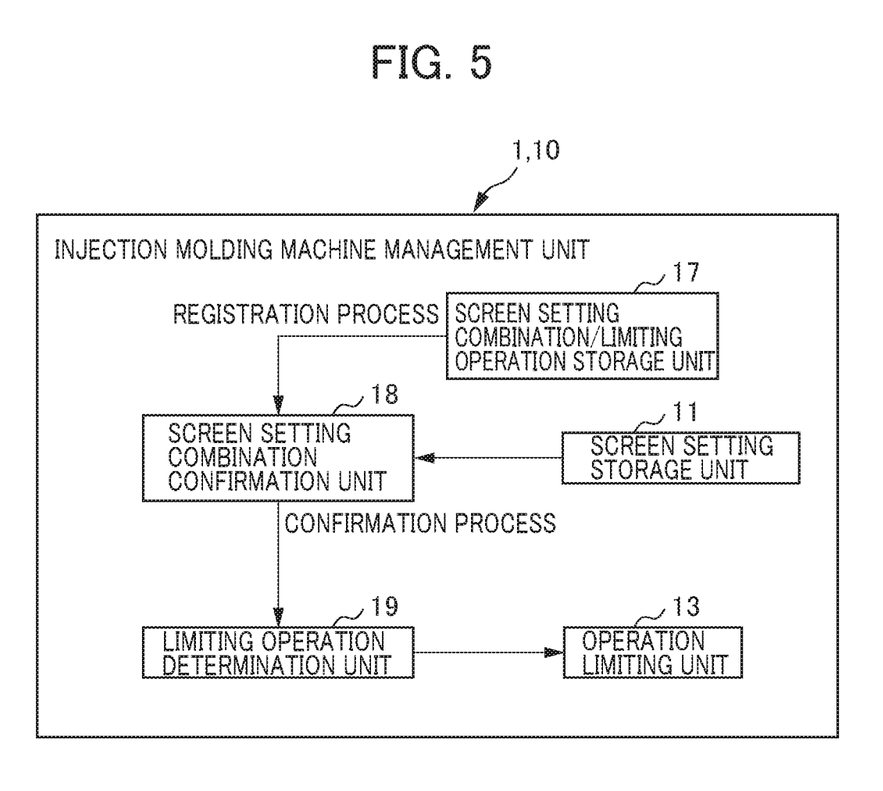
FIG. 5 is a block diagram showing an injection molding system of an embodiment, and showing a case in which an injection molding machine is provided with a management unit.

Furthermore, in the injection molding system A of the present embodiment, as shown in FIG. 5, the injection molding machine 1 itself may be provided with the management unit 10. In this case, the first to fourth communication units 12, 14, 15, and 20 may not necessarily be provided.

Figure 6:
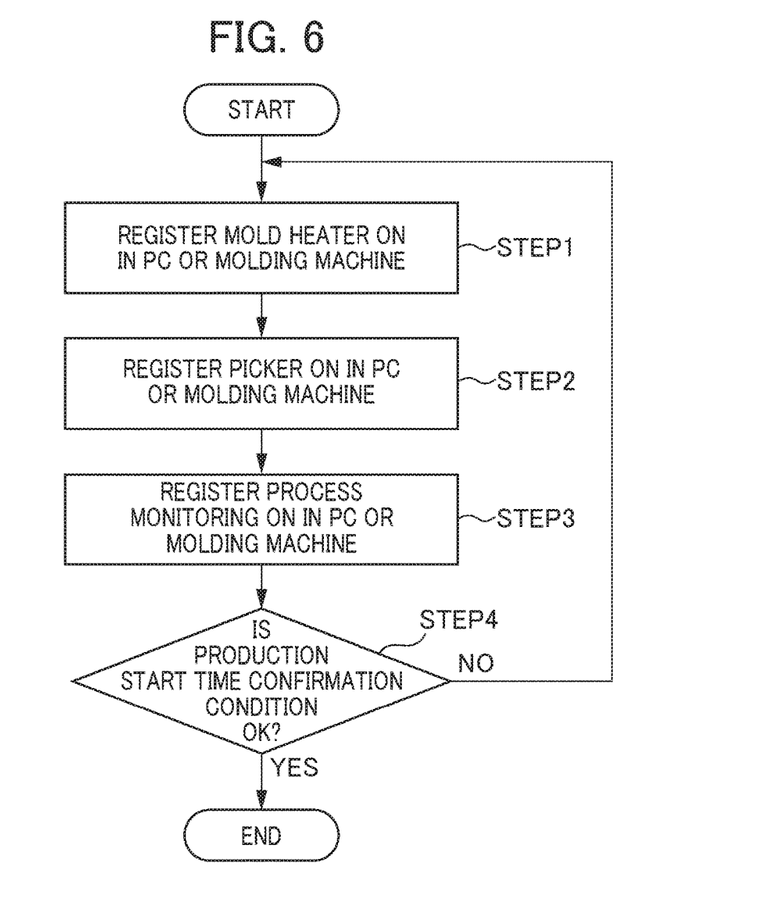
FIG. 6 is a flowchart showing an example of a registration process of registering a condition/setting of various peripheral devices using an injection molding system of an embodiment.

Furthermore, for both a case in which the management unit 10 is configured by the PC 21 as shown in FIG. 4 and a case in which the injection molding machine 1 is provided with the management unit 10 as shown in FIG. 5, the registration process of registering the list 16 of the correct combination of the screen settings and the limit operation to the storage unit 17 is performed, as shown in FIG. 6.

Figure 7:
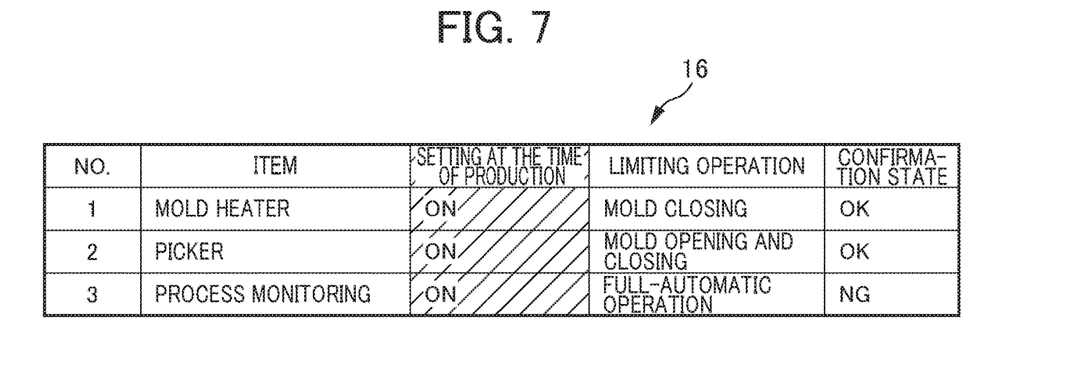
FIG. 7 is a diagram showing an example of a list shown by an injection molding system of an embodiment.

It should be noted that, in the present embodiment, as shown in FIG. 7, a description will be provided on the assumption that only the items including the mold heater, the picker, and the process monitoring are displayed in the list 16. However, for example, many other items may be displayed as in the list 16 shown in FIG. 3. In other words, items for which the setting confirmation is to be performed may be appropriately determined.

In the present embodiment, the registration process of registering the list 16 of the correct combination of the screen settings and the limiting operation to the storage unit 17, as shown in FIG. 6, first sequentially registers the settings at the time of production of the mold heater, the picker, and the process monitoring (Step 1, Step 2, and Step 3), and confirms whether all of the registrations of the production start time confirmation conditions have been completed (Step 4).

Figure 8:
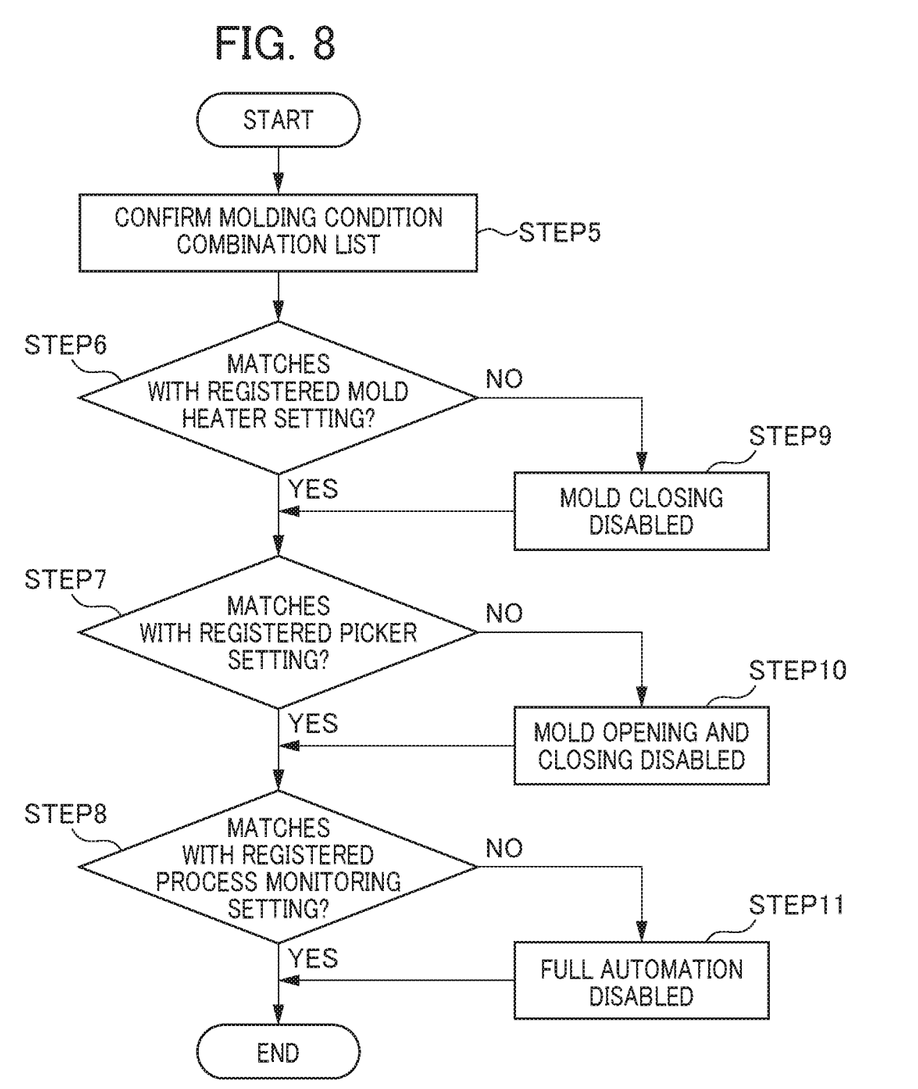
FIG. 8 is a flowchart showing an example of a confirmation process of comparing a condition/setting of various peripheral devices with a registered condition/setting using an injection molding system of an embodiment.

Next, after the registrations have been completed by the management unit 10 of the PC 21 or the management unit 10 of the injection molding machine 1, as shown in FIG. 8, the confirmation process of the screen setting combination is performed by the confirmation unit 18.

In this confirmation process, the confirmation unit 18 acquires, compares, and confirms the molding condition combination list 16 registered in the storage unit 17 and the information that is set and stored by the screen setting storage unit 11 of the injection molding machine 1.

For example, as shown in FIG. 8, after confirming the molding condition combination list 16 registered in the storage unit 17 (Step 5), the confirmation unit 18 compares the heater setting information of the mold 4 acquired through the first communication unit 12 and the third communication unit 15 with the registered mold heater setting information, and confirms whether or not they match each other (Step 6). Furthermore, similarly and sequentially, the confirmation unit 8 compares the setting information of the picker 2 and the setting information of the process monitoring to confirm whether they match (Step 7 and Step 8).

Furthermore, in each confirmation process (Step 6, Step 7, and Step 8), in a case in which the setting information does not match, the result therefrom is sent to the limiting operation determination unit 19, and the limiting operation determination unit 19 issues a command to the operation limiting unit 13 through the fourth communication unit 20 and the second communication unit 14 to perform control to limit the operation of the injection molding machine 1.

For example, as shown in FIG. 8, in a case in which the heater setting of the mold 4 does not match, the mold closing operation is limited (Step 9). In a case in which the settings of the picker 2 do not match, the mold opening-closing operation is limited (Step 10). In a case in which the process monitoring settings do not match, control is performed to disable full-automatic operation (Step 11).

Figure 9:
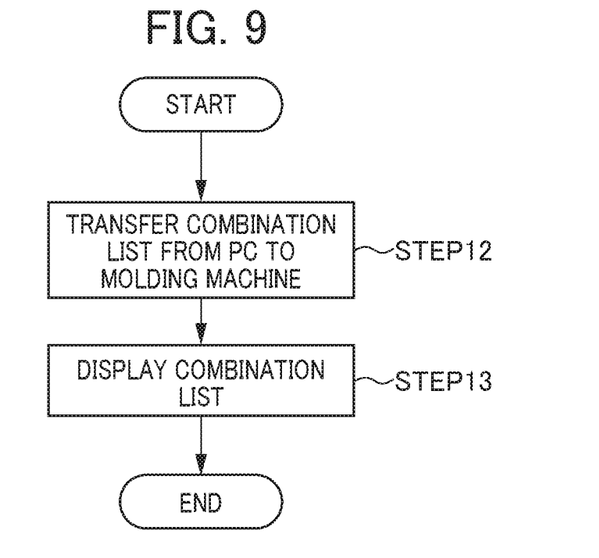
FIG. 9 is a flowchart showing processing of transferring a combination list to an injection molding machine from a PC in an injection molding system of an embodiment.

Here, as shown in FIG. 9, it may be configured such that, after the management unit 10 of the PC 21 performs the registration process and the confirmation process (Step 12), the combination list 16 is transferred to the injection molding machine 1 to display the combination list 16 (Step 13).

Figure 10:
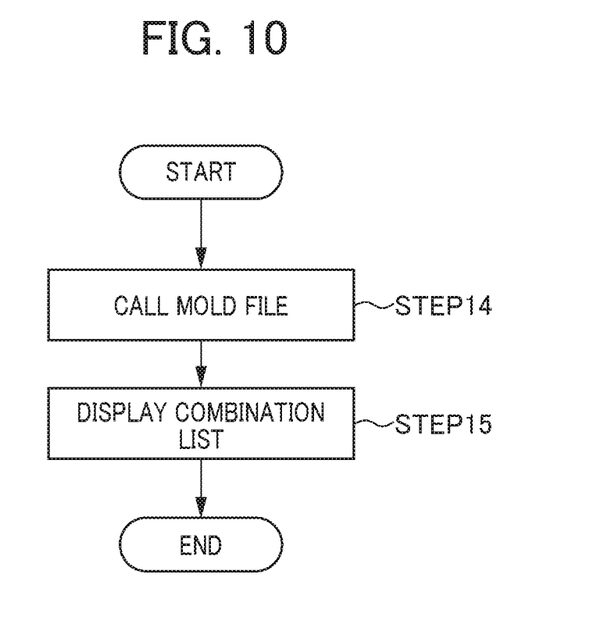
FIG. 10 is a flowchart showing processing of calling a mold file (molding condition file) and displaying a combination list in an injection molding system of an embodiment.

Furthermore, for example, in a case in which a molding condition file such as a mold file, i.e., a combination of the molding conditions for each mold is stored in the storage unit 17 (or the screen setting storage unit 11, or a storage unit provided separately in the mold 4), as shown in FIG. 10, the management unit 10 of the PC 21 or the injection molding machine 1 calls the mold file (molding condition file) (Step 14) to display the combination list 16 (Step 15). Thereafter, the registration process is performed for the screen setting combination and the limiting operation of the mold 4 corresponding to the molding condition to perform the confirmation process.

Figure 11:
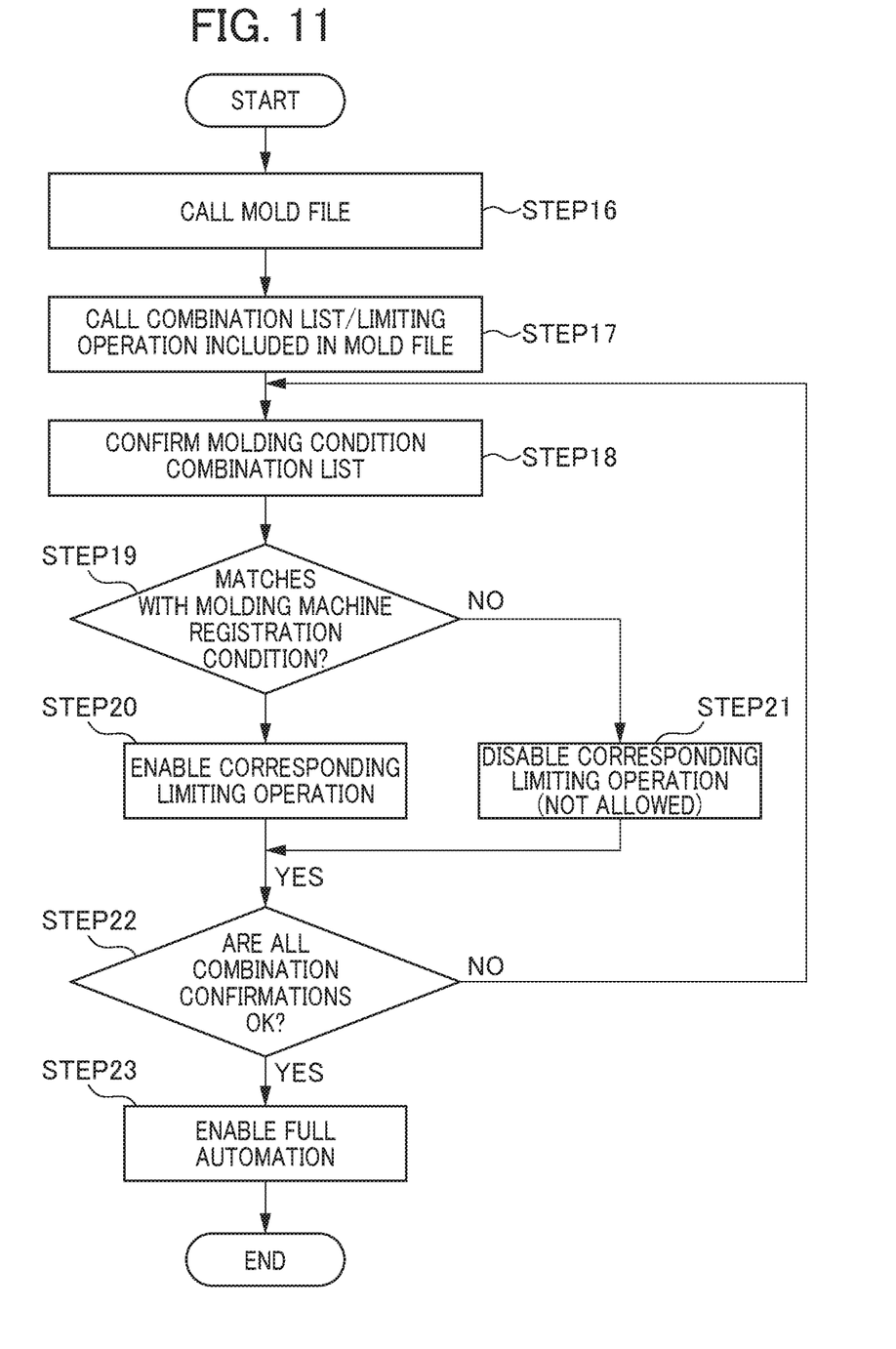
FIG. 11 is a flowchart showing an example of processing of automatically operating an injection molding machine using an injection molding system of an embodiment.

Furthermore, in a case of performing the automatic operation after the confirmation process is completed, for example, as shown in FIG. 11, the mold file (molding condition file) is called (Step 16), the combination list 16 and the limiting operation included in the mold file are called (Step 17), and the combination list 16 of the molding condition is confirmed (Step 18).

Thereafter, it is confirmed whether the setting of the called combination list 16 and the registration condition (setting condition) of the injection molding machine 1 match (Step 19).

In a case in which the setting of the called combination list 16 matches the registration condition of the injection molding machine 1, the corresponding limiting operation is enabled (Step 20). In a case in which the settings do not match, the corresponding limiting operation is disabled (not allowed), and the limiting operation sustains (Step 21).

Furthermore, it is confirmed whether all of the combinations have been confirmed (Step 22). After the confirmation, the automatic operation is enabled (Step 23).

Figure 3:
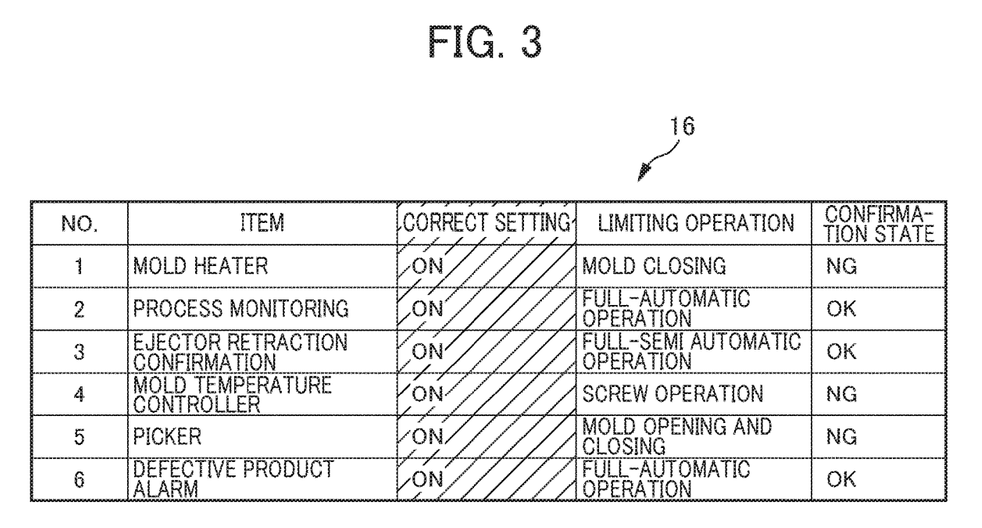
FIG. 3 is a diagram illustrating an example of a list shown by an injection molding system of an embodiment.

Therefore, in the injection molding system A of the present embodiment, the combination list 16 of the correct setting of the screen setting of the injection molding machine 1 and the limiting operation of the injection molding machine 1 corresponding thereto are prepared, and in a case in which the current setting is not as listed in the list 16, the control to disable the corresponding limiting operation can be performed.

Therefore, according to the injection molding system A of the present embodiment, it is possible to confirm the specifications of the injection molding machine 1 and the various peripheral devices, the combination of settings, and the setting of the limiting operation corresponding thereto easily and quickly, and thus it is possible to prevent/suppress the inconveniences such as production defects and mold damage occurring by operational error effectively and at a low cost as in the conventional manner.

Although an embodiment of the injection molding system has been described, the present invention is not limited to the one embodiment described above, and it can be appropriately modified to the extent that does not deviate from the spirit thereof.

EXPLANATION OF REFERENCE NUMERALS 1 injection molding machine
2 picker (robot: peripheral device)
3 temperature controller (peripheral device)
4 mold (mold management device)
5 resin feeder (material feeder)
6 communication unit (communication device)
10 management unit (injection molding system management unit)
11 screen setting storage unit
12 first communications unit (communication unit)
13 operation limiting unit
14 second communication unit (communication unit)
15 third communication unit (communication unit)
16 combination list
17 storage unit (screen setting combination/limiting operation storage unit)
18 confirmation unit (screen setting combination confirmation unit)
19 limiting operation determination unit
20 fourth communication unit (communication unit)
21 PC
A injection molding system

What is claimed is:

1. A method comprising:
storing, in a screen setting storage unit provided in an injection molding machine, a setting state of the injection molding machine;
storing, in a storage unit included in a management unit, a list of a correct combination of screen settings and limiting operation of the injection molding machine;
comparing, by a confirmation unit included in the management unit, information of the screen setting storage unit and information of the storage unit to confirm a propriety of a combination of the screen settings of the injection molding machine;
determining, by a limiting operation determination unit included in the management unit, a limiting operation upon receiving a result confirmed by the confirmation unit to issue an operation limiting command to an operation limiting unit provided in the injection molding machine; and
limiting operation of the injection molding machine according to the determined limiting operation using the operation limiting unit.

2. The method according to claim 1, wherein a personal computer is provided with the management unit.

3. The method to claim 1, wherein the injection molding machine is provided with the management unit.

4. The method according to claim 1, further comprising storing, in a mold file in the storage unit, the list of the correct combination of the screen settings and the limiting operation of the injection molding machine, and
wherein the limiting operation of the injection molding machine includes prohibiting operation of an automatic operation until a confirmation completion of all setting states.

5. The method according to claim 1,
wherein the storing the setting state of the injection molding machine includes determining a plurality of items for which setting confirmation is to be performed and sequentially registering a confirmation condition for each of the plurality of items, and
wherein in the comparing, the confirmation unit compares the information of the screen setting storage unit and the information of the storage unit with respect to each of the items so as to confirm the propriety of the combination of the screen settings of the injection molding machine.

6. The method according to claim 5, wherein the items include two or more different items selected from a mold heater, process monitoring, confirmation of retraction of an ejector, a mold temperature controller, a picker, and a defective product alarm.

7. The method according to claim 2, further comprising storing, in a mold file in the storage unit, the list of the correct combination of the screen settings and the limiting operation of the injection molding machine, and wherein the limiting operation of the injection molding machine includes prohibiting operation of an automatic operation until a confirmation completion of all setting states.

* * * * *